US006555777B1

(12) United States Patent
Stoppek

(10) Patent No.: US 6,555,777 B1
(45) Date of Patent: Apr. 29, 2003

(54) METHOD OF MANUFACTURING BIMETAL SLIPPERS

(75) Inventor: Robert J. Stoppek, Huxley, IA (US)

(73) Assignee: Sauer-Danfoss Inc., Ames, IA (US)

( * ) Notice: Subject to any disclaimer, the term of this patent is extended or adjusted under 35 U.S.C. 154(b) by 0 days.

(21) Appl. No.: 10/043,783

(22) Filed: Jan. 11, 2002

(51) Int. Cl.⁷ ................ B23K 11/00; B23P 15/10; B21K 1/18
(52) U.S. Cl. .............. 219/117.1; 219/113; 219/93; 29/888.042; 29/888.044; 92/158
(58) Field of Search ............... 219/113, 93; 29/888.02, 29/888.04, 888.042, 888.044, 888.047, 888.048; 91/488; 92/157, 158

(56) References Cited

U.S. PATENT DOCUMENTS

| | | | |
|---|---|---|---|
| 3,319,575 A | | 5/1967 | Havens |
| 3,360,632 A | * | 12/1967 | Huffman .................. 219/113 |
| 3,741,077 A | * | 6/1973 | Hulsebus et al. ............ 92/57 |
| 3,805,014 A | * | 4/1974 | Becker ...................... 219/92 |
| 4,191,095 A | | 3/1980 | Heyl |
| 4,476,366 A | * | 10/1984 | Kurtz et al. ............. 219/56.22 |
| 4,893,548 A | * | 1/1990 | Kawahara et al. ............ 91/499 |
| 5,265,331 A | | 11/1993 | Engel et al. |
| 5,392,693 A | * | 2/1995 | Engel et al. .................. 92/248 |
| 5,490,446 A | | 2/1996 | Engel |
| 5,553,378 A | | 9/1996 | Parekh et al. |
| 6,089,617 A | | 7/2000 | Craig et al. |

FOREIGN PATENT DOCUMENTS

DE 43 33 283 A1 * 3/1994

* cited by examiner

Primary Examiner—M. Alexandra Elve
Assistant Examiner—Kevin McHenry

(57) ABSTRACT

A method of manufacturing male bimetal slippers includes the steps of forming a stem having opposite first and second ends; rigidly affixing a ball on the first end of the stem to form a male slipper body; and capacitance discharge welding a wear pad to the second end of the stem. To manufacture female bimetal slippers the method includes forming a slipper body of a first material, the body having opposite first and second ends, the first end having a ball socket formed therein; and capacitance discharge welding a wear pad of a second material to the second end of the body.

12 Claims, 12 Drawing Sheets

METHOD OF MANUFACTURING BIMETAL SLIPPERS

BACKGROUND OF THE INVENTION

The present invention relates to the field of hydraulic units such as axial piston pumps and motors. More particularly, this invention relates to a method of manufacturing slippers that are pivotally connected to the axial reciprocating pumping or motoring pistons in such hydraulic units. The method can be used to provide bimetal male or female slippers.

A slipper in a hydraulic pump or motor must at one end provide a relatively soft, wearable hydrostatic running and sealing surface and at the other end be relatively hard and strong enough to withstand the forces associated with swivelingly connecting to one of the pistons. Using different materials for the running surface and the rest of the slipper might help better meet these divergent requirements. However, a cost-effective functional design and method of manufacturing a bimetal slipper has thus far not been developed.

Therefore, a primary objective of the present invention is the provision of a cost-effective method of manufacturing a bimetal slipper.

Another objective of this invention is the provision of a method of manufacturing bimetal slippers that utilizes capacitance discharge welding and is adaptable to both male and female slippers.

Another objective of this invention is the provision of a method of manufacturing bimetal slippers that is robust and provides reliable slippers and piston-slipper joints.

These and other objectives will be apparent from the drawings, as well as from the description and claims that follow.

BRIEF SUMMARY OF THE INVENTION

This invention relates to a method of manufacturing slippers that are pivotally connected to pistons in hydraulic units. The method can be used to provide bimetal male or female slippers.

To manufacture male bimetal slippers the steps include forming a stem having opposite first and second ends; rigidly affixing a ball on the first end of the stem to form a male slipper body; and capacitance discharge welding a wear pad to the second end of the stem. To manufacture female bimetal slippers the method includes forming a slipper body of a first material, the body having opposite first and second ends, the first end having a ball socket formed therein; and capacitance discharge welding a wear pad of a second material to the second end of the body.

Forming a pair of concentric annular projections on the second end of the stem or slipper body helps ensure the load carrying capacity, leak integrity and strength of the welded joint between the body and the wear pad. In the case of the male slipper, forming a central longitudinal lubrication passage through the stem and using the lower peripheral edge thereof, at the stem's first end, as a seat for the ball also provides predictability for the process of welding the ball to the stem. The means and method disclosed herein result in low cost bimetal slippers.

DETAILED DESCRIPTION OF THE INVENTION

Figure 1:
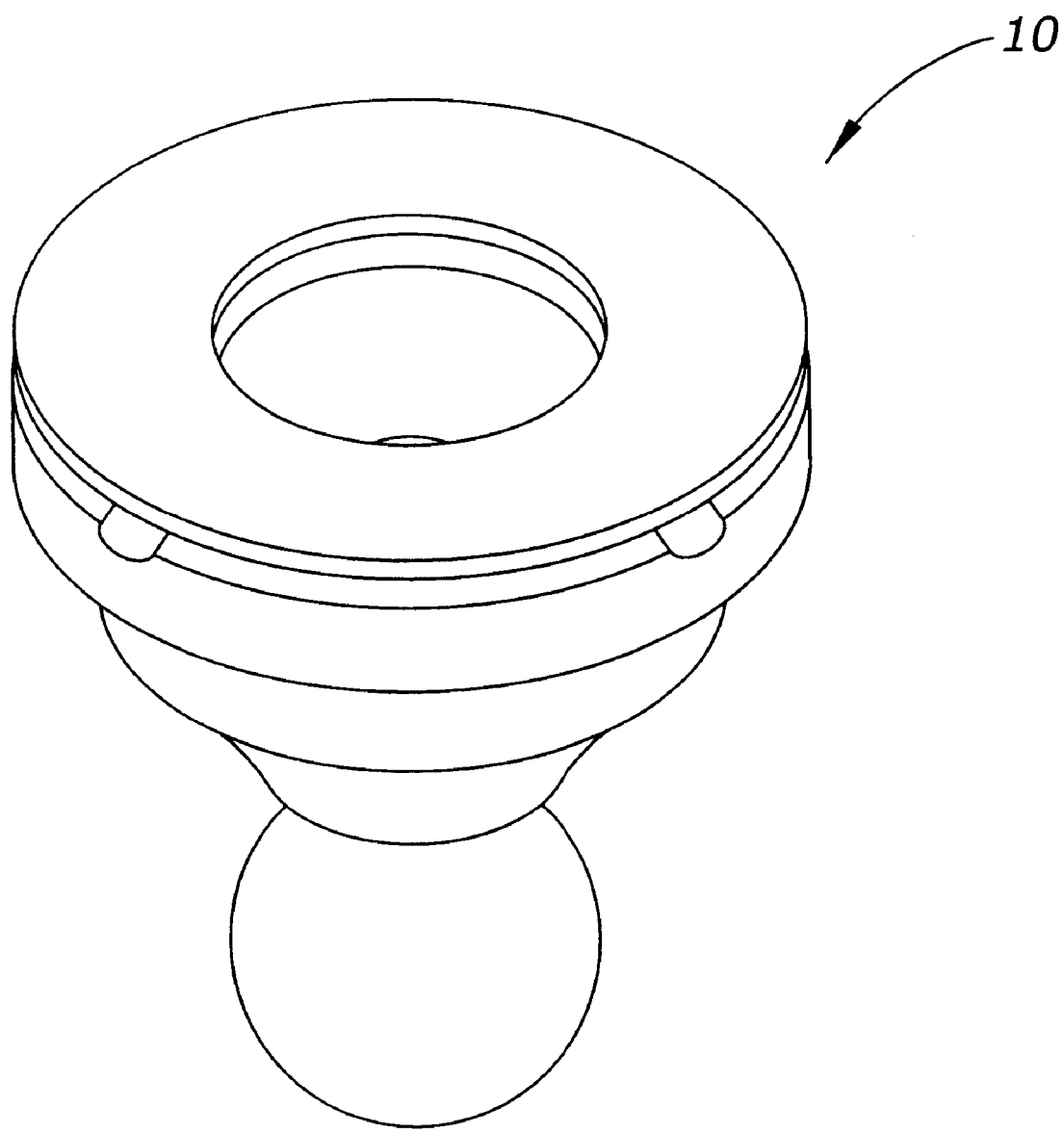
FIG. 1 is a perspective view of one embodiment of a male bimetal slipper according to the present invention.
Figure 2:
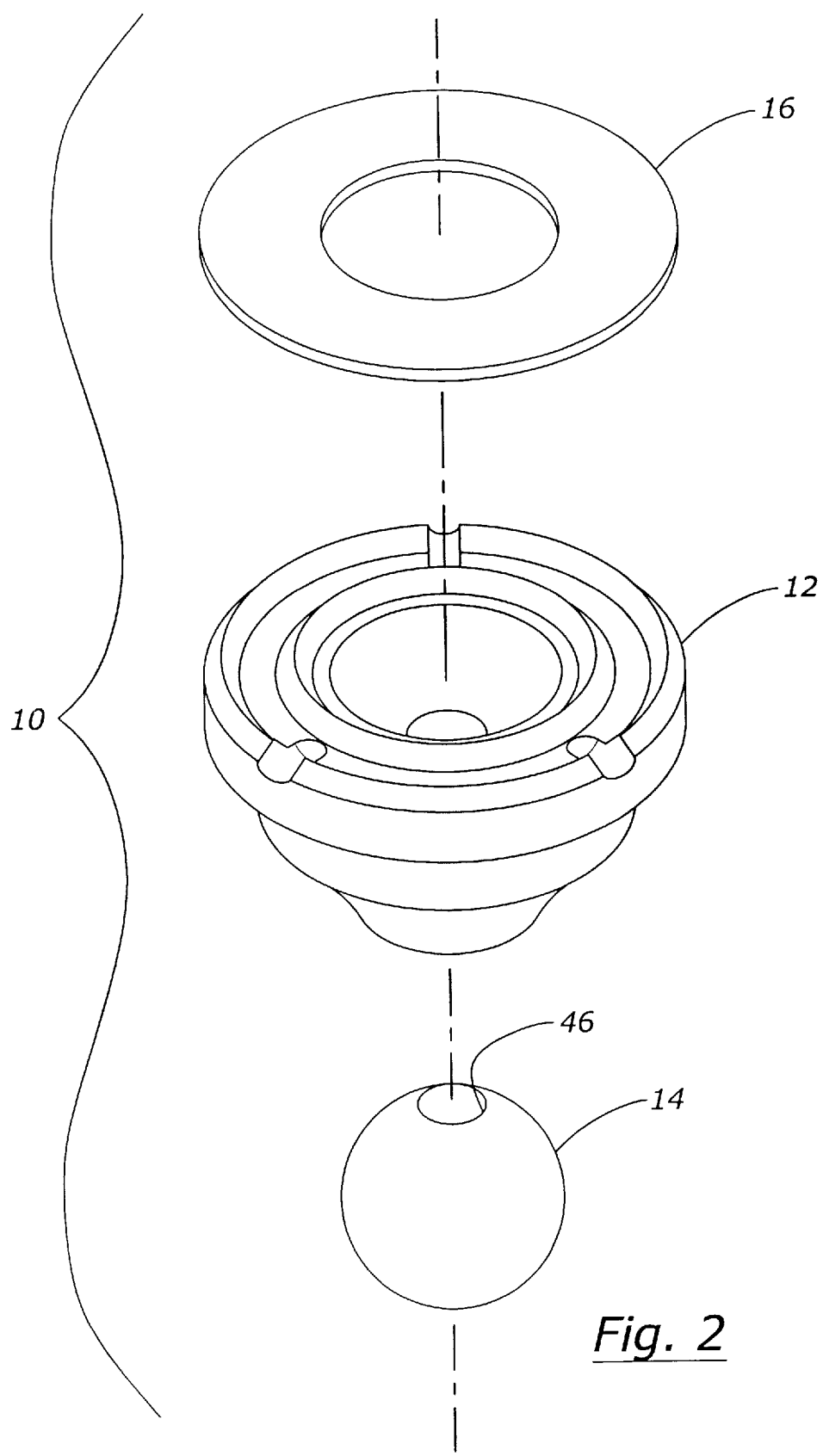
FIG. 2 is an exploded assembly view of the male bimetal slipper of FIG. 1.
Figure 6:
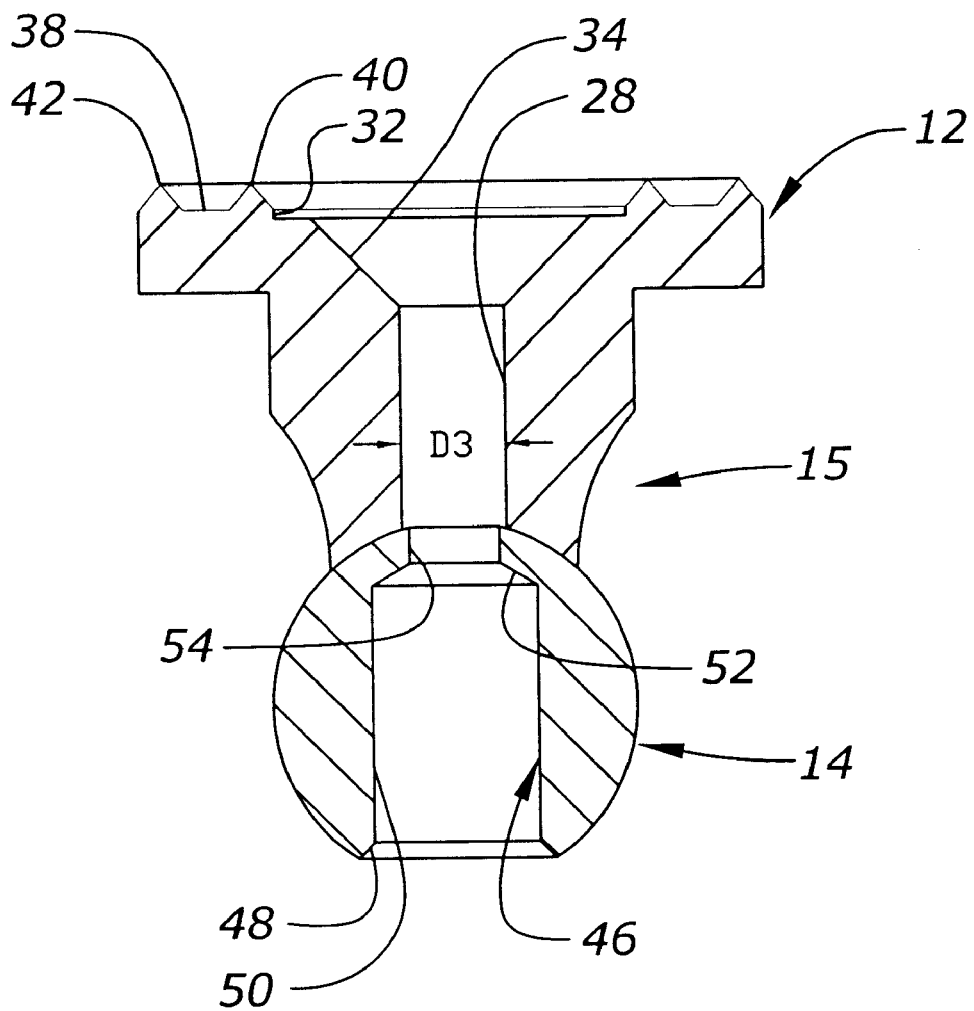
FIG. 6 is a diametrical cross-sectional view of the slipper body, which comprises the slipper stem with the ball welded thereto.

In the drawings and the description below, like reference numerals designate like features or components. Referring to FIGS. 1–6, a male slipper is generally designated by the reference numeral 10. As best seen in FIG. 2, the male slipper 10 includes a body or stem 12, a ball 14 and a wear pad 16 that is preferably an annular disk or washer. Preferably the body 12 and the ball 14 are steel and the wear pad 16 is brass. These three components are permanently affixed to each other. The ball 14 is permanently affixed to the stem 12 as shown by capacitance discharge welding to integrally form a slipper body 15 (FIG. 6).

Figure 3:
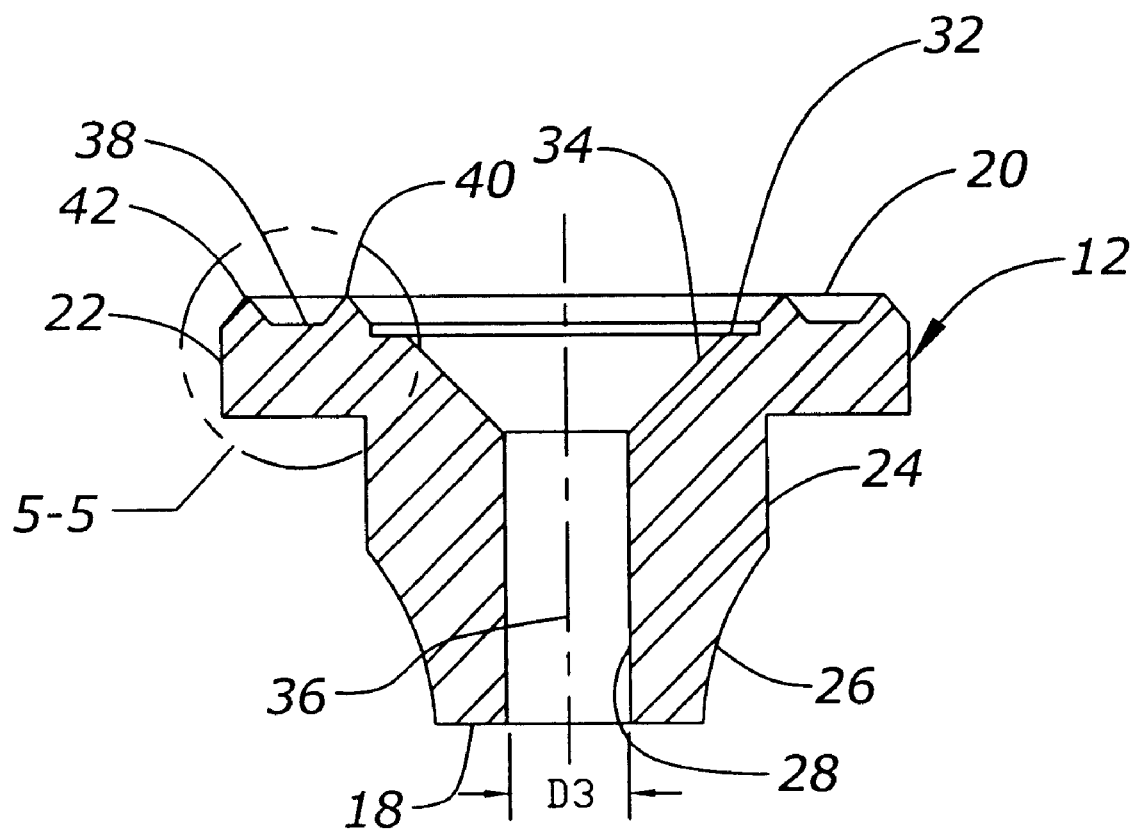
FIG. 3 is a diametrical cross-sectional view of the slipper stem from FIG. 2.

Referring to FIG. 3, the stem 12 has opposite first and second ends 18, 20. The first end 18 is substantially planar. The stem 12 has an enlarged diameter upper portion 22 adjacent the second end 20, an intermediate portion 24 that has a smaller diameter, and a tapered lower portion 26 that terminates with an even smaller diameter at the first end 18. A lubrication passage 28 extends longitudinally through the stem 12. At its upper end, the lubrication passage 28 includes a counterbore 32 and a countersink 34. Preferably the lubrication passage 28 extends along the central axis 36 of the stem 12 as shown.

Figure 4:
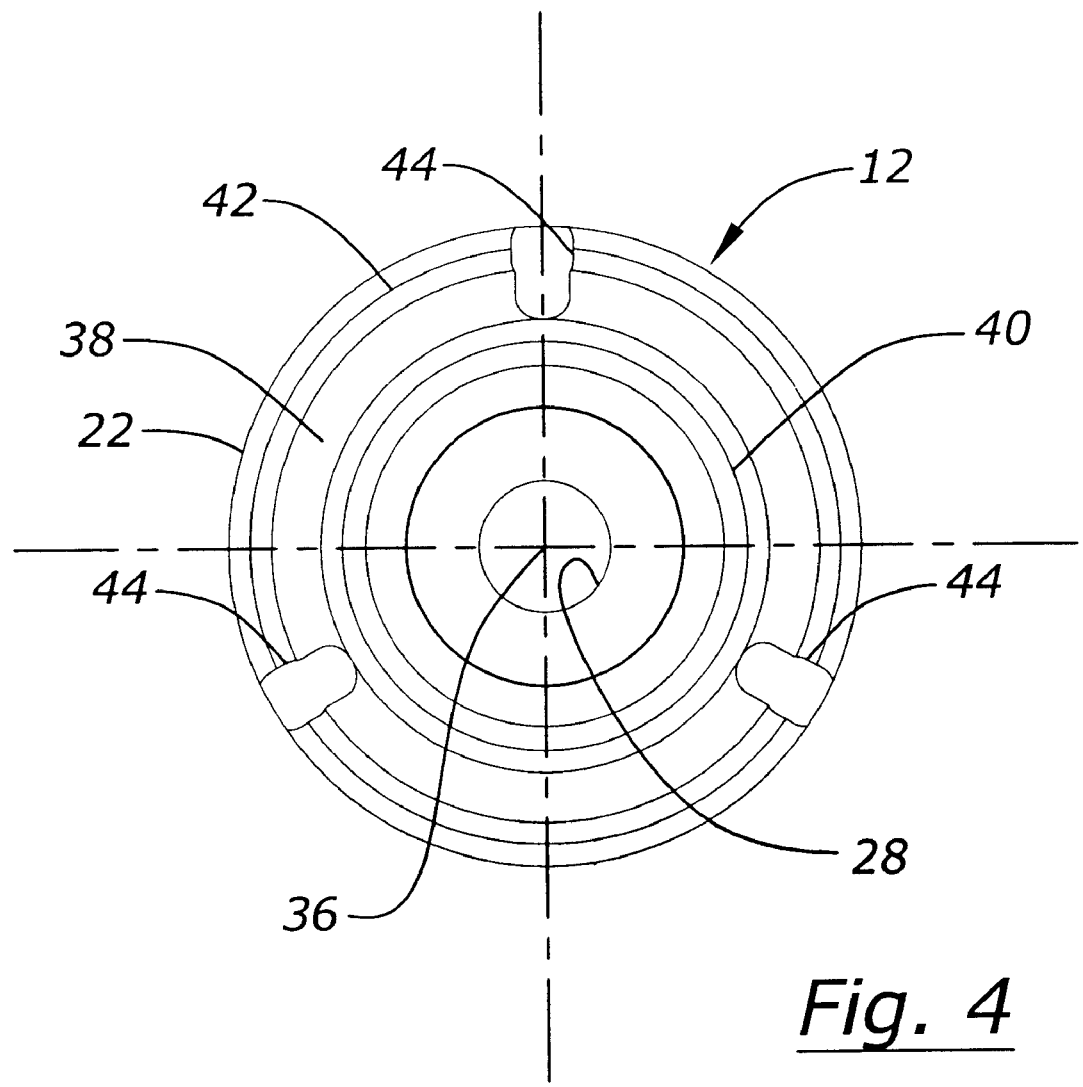
FIG. 4 is a top plan view of the slipper stem of FIG. 2 and shows the annular ridges or projections, annular groove, and optional radial grooves in the top of the slipper stem.
Figure 5:
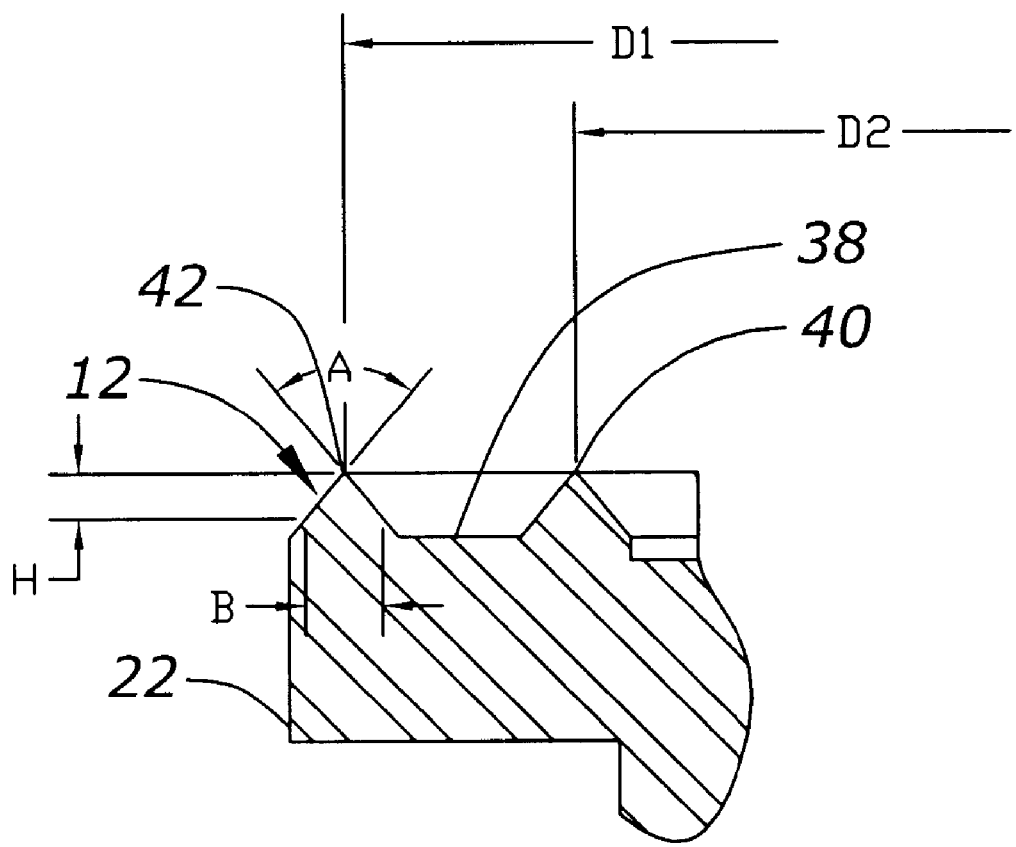
FIG. 5 is a cross-sectional view of the area designated 5—5 in FIG. 3.

The second end 20 of the stem 12 includes an annular groove 38 that separates or spaces a pair of concentric inner and outer projections or ridges 40, 42. The projections 40, 42 have an included angle of approximately 80–100 degrees, more preferably approximately 90 degrees. As best seen in FIG. 4, a plurality of optional radial pressure relief grooves 44 extend inwardly from the outer periphery of the stem 12 so as to be in fluid communication with the annular groove 38. Thus, high pressure hydrualic fluid from the lubrication passage 28 can not build up in the annular groove 38 to force the wear pad 16 off the stem 12.

Referring to FIG. 6, the ball 14 is a modified standard steel ball bearing. A lubrication passage 46 is formed in the ball 14 while the ball 14 is in either a hardened or unhardened state as best seen in FIG. 6. The lubrication passage 46 includes a frusto-conical lead-in countersink 48, a main bore 50, a frusto-conical transitionary countersink 52, and a terminal bore 54 at the upper surface of the ball 14. The diameter of the terminal bore 54 is preferably smaller than the diameter of the main bore 50 (and the passage 28) to provide a larger volume of material around the terminal bore 54. This presents a larger projection volume on the ball 14 for capacitance discharge welding for additional structural joint strength. However, the transitional countersink 52 is optional and the terminal bore 54 could be the same size as the main bore 50 if the common diameter is equal to or slightly less than the diameter D3. Care must be exercised in selecting the size of the terminal bore 54 so that it does not act as a significant flow restriction or, in other words, function as an orifice.

The method of manufacturing the bimetal male slipper 10 includes the steps of: 1) forming a stem 12 having opposite first and second ends 18, 20; 2) rigidly affixing a ball 14 on the first end 18 of the stem 12 by capacitance discharge welding to form an intergral slipper body 15; and 3) capacitance discharge welding the wear pad 16 (preferably of a different material) to the second end 20 of the stem 12.

Figure 7:
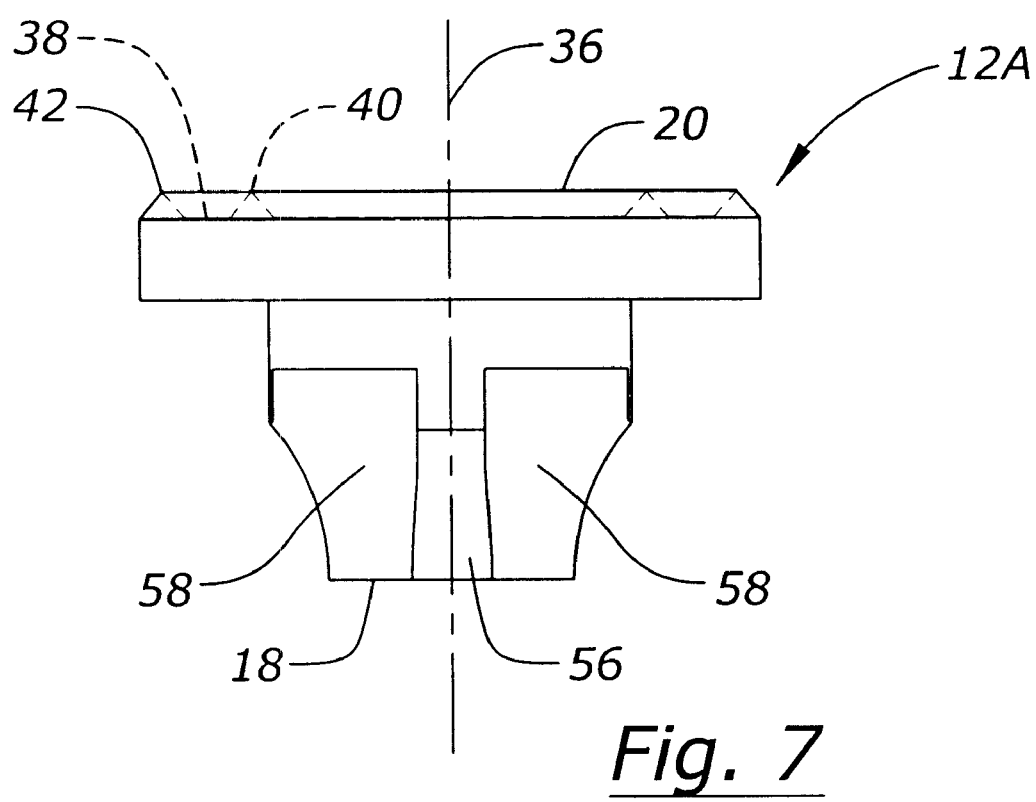
FIG. 7 is a front elevation view of an alternative embodiment of the male bimetal slipper of this invention wherein the slipper stem has alternating cutouts and ribs to save material, reduce weight, and maintain strength.
Figure 8:
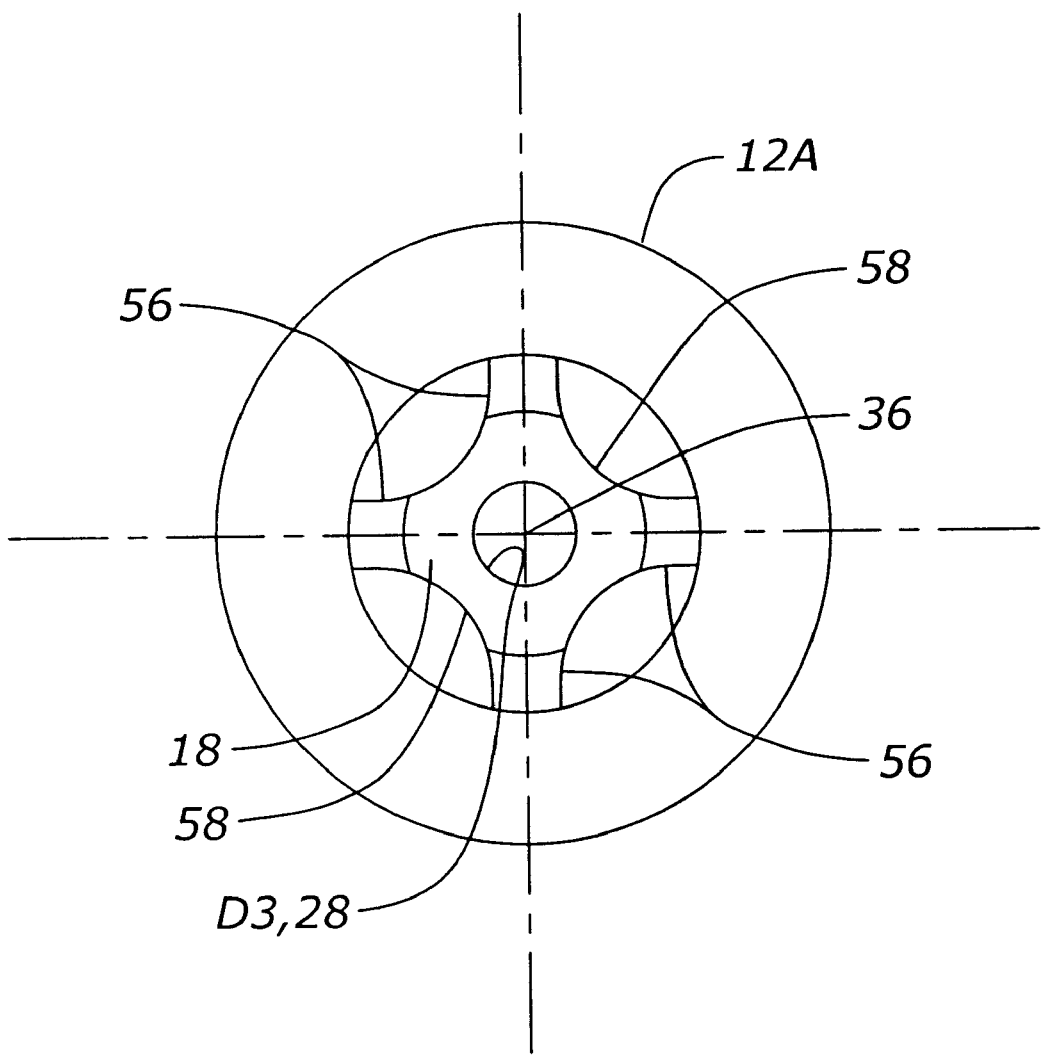
FIG. 8 is a plan view of the bottom of the slipper stem of FIG. 7, which illustrates the cutouts and ribs on the slipper stem.
Figure 9:
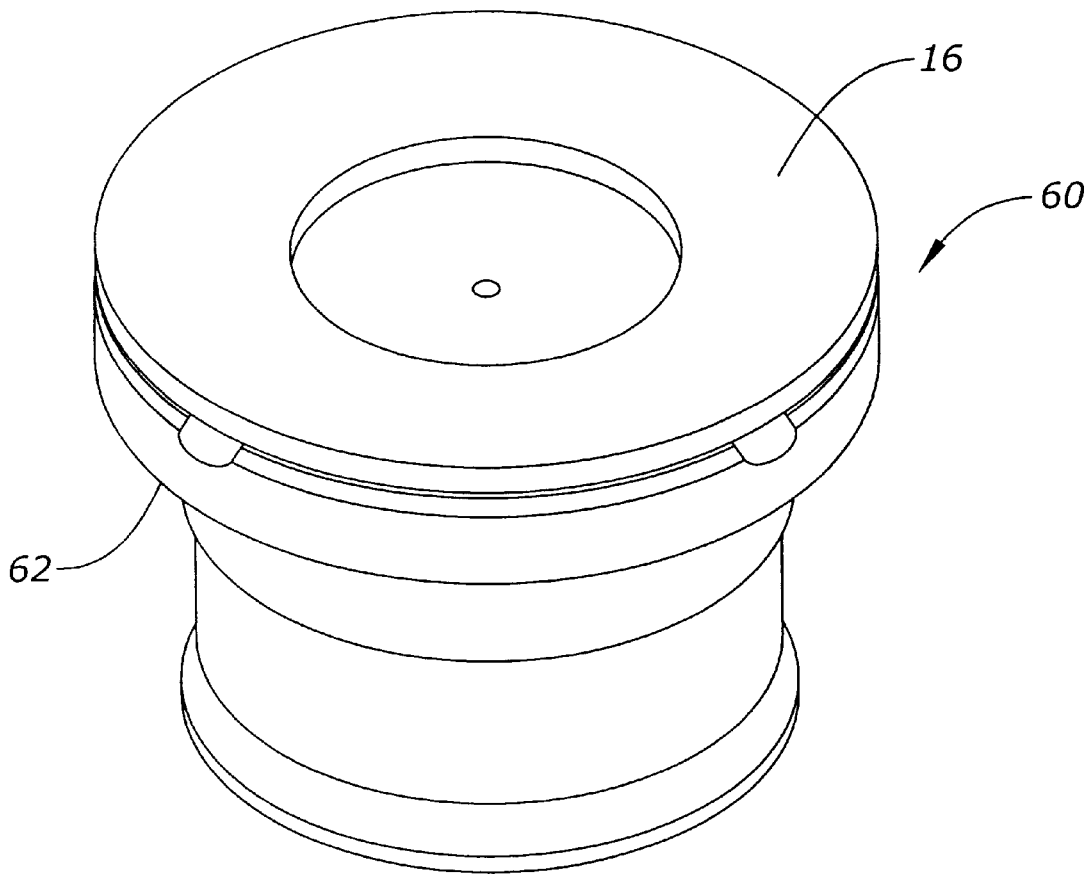
FIG. 9 is a perspective view of a female bimetal slipper according to the present invention.
Figure 10:
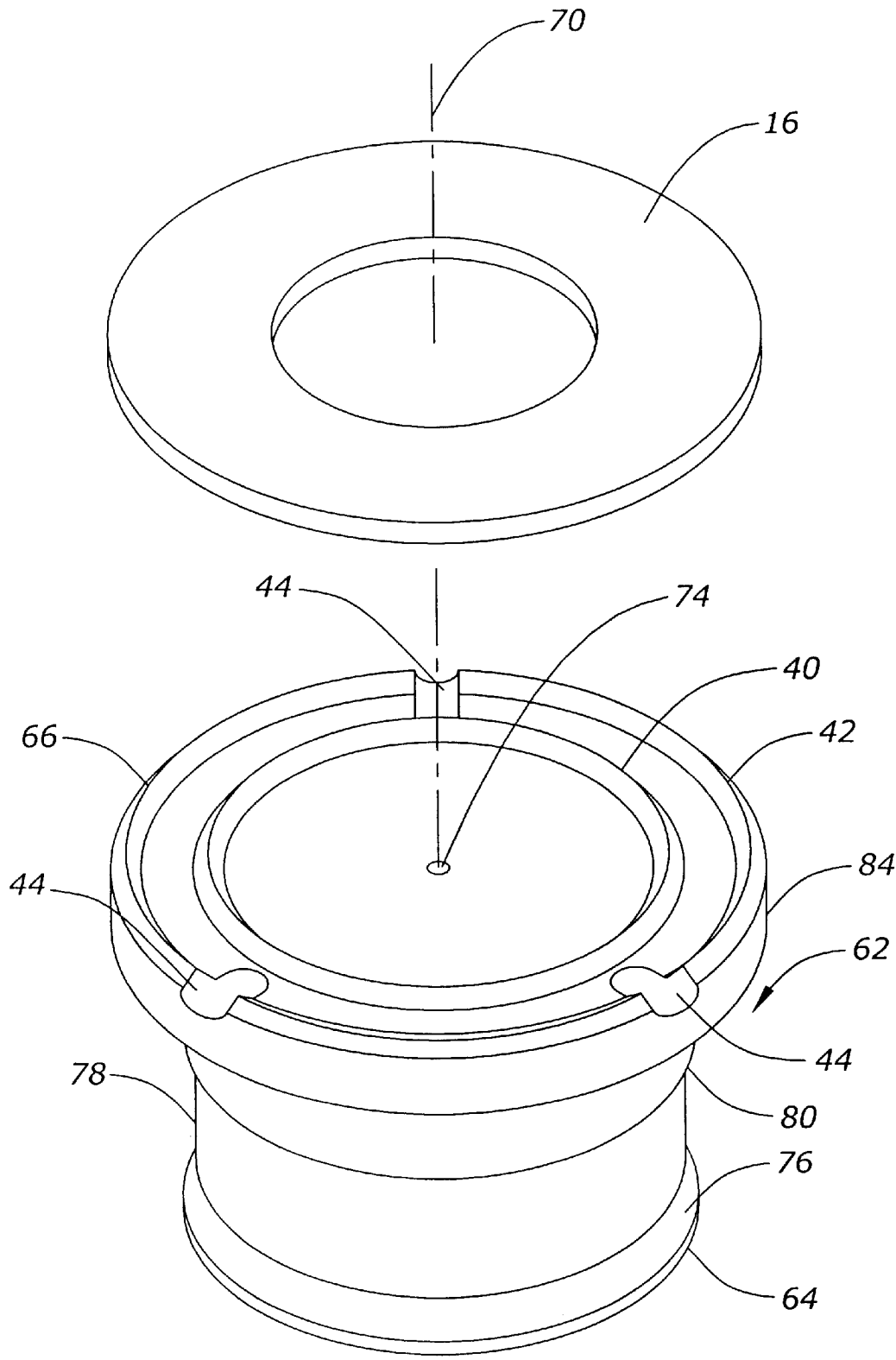
FIG. 10 is an exploded assembly view of the female bimetal slipper of FIG. 9.
Figure 11:
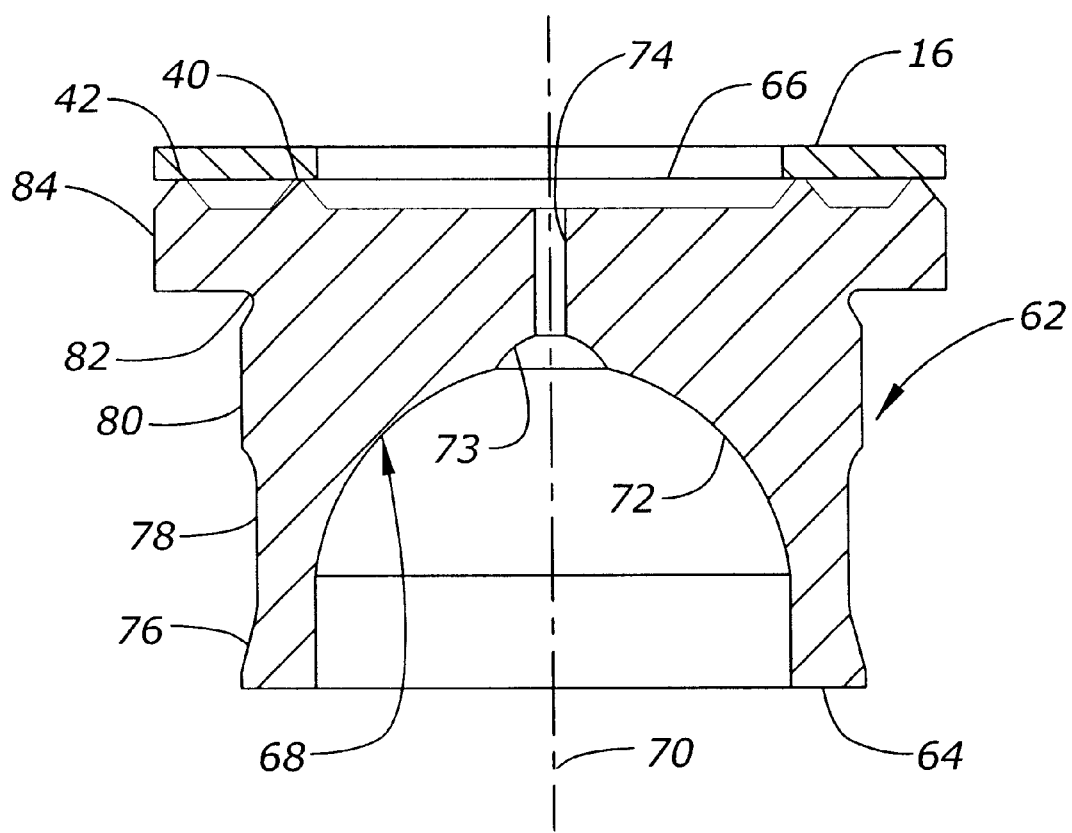
FIG. 11 is a diametrical cross-sectional view of the female slipper body and washer from FIG. 10 at the onset of the welding process.
Figure 11A:
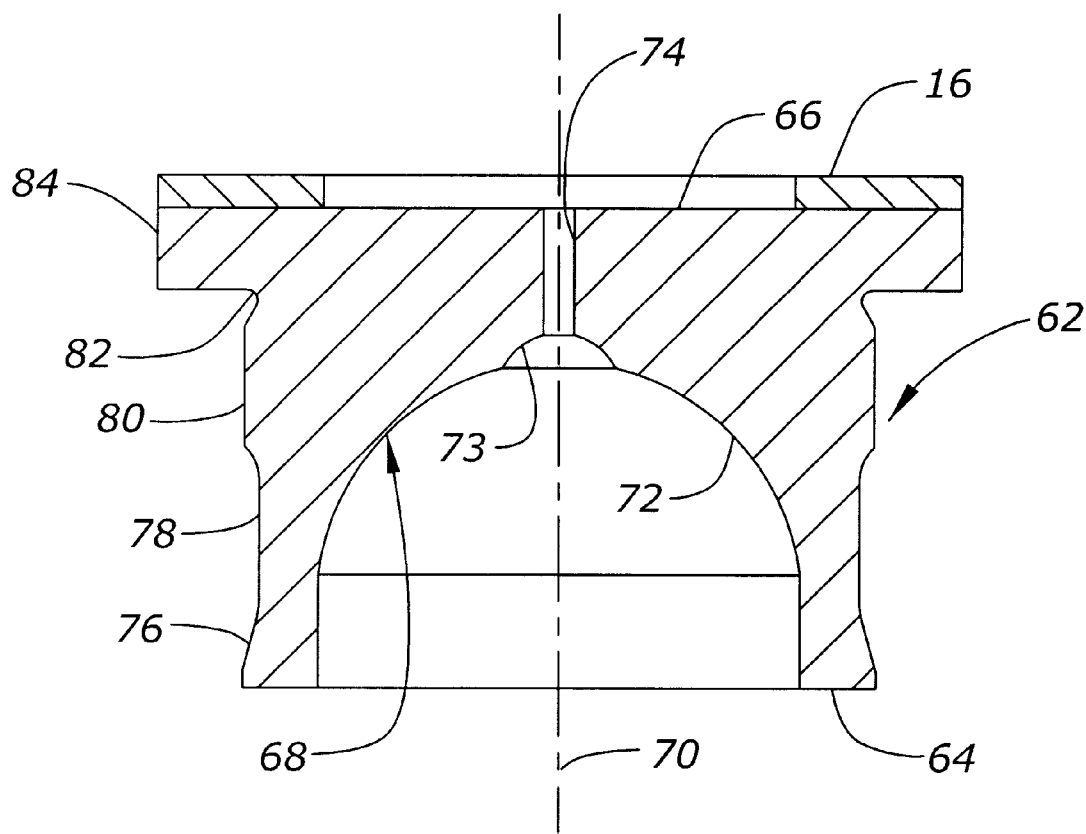
FIG. 11A is a diametrical cross-sectional view similar to FIG. 11 but shows the slipper after the washer has been welded to the body.

FIGS. 7 and 8 illustrate an alternative embodiment in which the stem 12A of the male slipper has a plurality of alternating ribs 56 and cut-outs or recesses 58 on the tapered portion adjacent the end 18. The recesses 58 reduce the weight of the stem 12A and the ribs 56 help maintain its strength and rigidity while still providing suitable projection surfaces for the welding process.

Referring to FIGS. 9–11A, a female slipper 60 can be produced according to the present invention. The female slipper 60 includes a substantially cylindrical slipper body 62 and a wear pad 16. The slipper body 62 is preferably formed of steel and the wear pad 16 is preferably an annular disk or washer formed of brass. The slipper body 62 has opposite first and second ends 64, 66. The first end 64 includes a socket 68 therein for receiving the ball of a conventional piston (not shown). The socket 68 extends along a central axis 70 of the body 62 and terminates in a hemispherical upper wall 72. A smaller partially spherical recess 73 is formed at the upper end of the upper wall 72. A lubrication passage 74 extends through the body 62, preferably along the central axis 70. An outwardly flared skirt portion 76 is adjacent to the first end 64 of the body 62. As is conventional, the flared skirt 76 can be swedged or crimped inwardly to swivelingly connect the slipper 60 to the ball and piston. Above the skirt portion 76, the body 62 includes a first cylindrical portion 78 and a second slightly wider cylindrical portion 80. An undercut 82 is formed between the second cylindrical portion 80 and an enlarged diameter portion 84 that resides adjacent the second end 66 of the body 62.

The second or upper end 66 of the body 62 is similar to the upper end 20 of the stem 12 that has already been described. An annular groove 38 separates concentric annular projections or ridges 40, 42. A plurality of radial relief grooves 44 are equally spaced around the periphery as shown.

The joints between the various components of the slippers 10, 10A, 60 must be capable of transmitting load and prevent high pressure hydraulic fluid leaks from the lubrication passages 28, 46, 74. With considerable study and experimentation, capacitance discharge welding has been found to provide an efficient and robust process for essentially permanently affixing the components together in a leak-free manner. In the capacitance discharge welding process, stored energy is discharged through electrodes into the slipper components being joined. The discharge of the stored energy results in heat at the contact points or projections 40, 42, etc. The heat causes the material at the contact points to reach molten conditions. A conventional set down mechanism forces the components together and fuses the molten materials together.

Many factors can influence the capacitance discharge welding process. Some of these factors relate to the geometry of the projections where the components are joined. For example, if the manufacturer seeks a constant weld depth H of approximately 0.7 mm., the included angle A of the projections 40, 42 on the stem 12 or slipper body 62, as well as the diameters D1, D2, can result in different projection volumes V for welding purposes. See FIG. 5 and Table 1 below.

TABLE 1

| H (mm) | A (degrees) | D1 (mm) | D2 (mm) | B (mm) | V (mm3) |
|---|---|---|---|---|---|
| 0.7 | 80 | 16.08 | 10.87 | 1.17 | 34.81 |
| 0.7 | 90 | 15.85 | 11.10 | 1.40 | 41.49 |
| 0.7 | 100 | 15.58 | 11.37 | 1.67 | 49.44 |

The weld projection volume V or $V_{Face}$ for the wear pad joint can be approximated by the following equation.

$$V_{Face} = V_{Outer} + V_{Inner} = \frac{\pi}{2}[(BD_1H) + (BD_2H)]$$

When the bottom surface 18 of the stem 12 is substantially planar and the lubrication passage 28 is perpendicular to the surface 18, a 90 degree projection angle results for the ball joint. The projection volume V or $V_{Periphery}$ around the lubrication passage 28 or the diameter D3 influences the projection volume V for welding as shown in Table 2 below.

TABLE 2

| H (mm) | A (degrees) | D3 (mm) | B (mm) | V (mm3) |
|---|---|---|---|---|
| 0.7 | 90 | 2.75 | 1.40 | 4.23 |
| 0.7 | 90 | 3.00 | 1.40 | 4.23 |
| 0.7 | 90 | 3.25 | 1.40 | 5.00 |

The following equation approximates the projection volume V for capacitance discharge welding for the ball joint.

$$V_{Periphery} = \frac{\pi}{2}D_3BH$$

The projection volumes establish the initial starting input signals for weld energy. Other major factors that influence the capacitance discharge welding process are pulse time, weld energy, weld force and the number of pulses. For the examples found in Tables 1 and 2, the values shown below in Table 3 have given the best results for one size of slippers where the stem/body is constructed of ASTM 4140 steel. Of course, these parameters may vary with different sizes and stem/body materials or hardnesses.

TABLE 3

| | BRASS WASHER TO STEM/BODY | BALL TO STEM/BODY |
|---|---|---|
| Weld Energy: | 8.0 KJ | 1.2 KJ |
| Weld Force: | 1000 daN | 550 daN |
| Pulse Time: | Medium | Medium |
| Pulse #: | 2 | 2 |

The present invention utilizes a capacitance discharge welding process that is quick and easy to control. The capacitance discharge welding process is adaptable to male or female bimetal slippers. The structures and process disclosed herein result in strong, reliable and leak-free joints. The invention yields low cost bimetal slippers.

Thus, it can be seen that the present invention at least achieves its stated objectives.

In the drawings and specifications, there has been set forth a preferred embodiment invention, and although specific terms are employed, these are used in a generic and descriptive sense only and not for purposes of limitation. Changes in the form and proportion of parts as well as in the substitution of equivalents are contemplated as circumstances may suggest or render expedient without departing from the scope of the invention as defined in the following claims.

What is claimed is:

1. A method of manufacturing a female bimetal slipper for a hydraulic unit comprising the steps of:

forming a slipper body of a first material, the body having opposite first and second ends, the first end having a ball socket formed therein; and capacitance discharge welding a wear pad of a second material to the second end of the body.

2. The method of claim 1 comprising forming the slipper body of steel and forming the wear pad of brass.

3. The method of claim 1 wherein the step of forming the slipper body includes forming a pair of concentric annular V-shaped projections and an annular groove therebetween on the second end of the body to establish a desired projection volume for welding.

4. The method of claim 3 comprising forming the annular V-shaped projections such that said projections have an included angle of 80–100 degrees.

5. The method of claim 4 comprising forming the annular V-shaped projections such that said projections have an included angle of 90 degrees.

6. A method of manufacturing a male bimetal slipper for a hydraulic unit comprising the steps of:

forming a stem having opposite first and second ends;

rigidly affixing a ball on the first end of the stem to form a slipper body; and capacitance discharge welding a wear pad to the second end of the stem.

7. The method of claim 6 comprising forming the stem and the ball of steel and forming the wear pad of brass.

8. The method of claim 6 comprising capacitance discharge welding the ball on the first end of the stem to form a slipper body.

9. The method of claim 6 wherein the step of forming the slipper stem includes forming a pair of concentric annular V-shaped projections and an annular groove therebetween on the second end of the stem to establish a desired projection volume for welding.

10. The method of claim 9 comprising forming the annular V-shaped projections such that said projections have an included angle of 80–100 degrees.

11. The method of claim 10 comprising forming the annular V-shaped projections such that said projections have an included angle of 90 degrees.

12. The method of claim 9 comprising forming the wear pad as an annular disk and positioning the disk in registered relation with the projections before welding the wear pad to the stem.

* * * * *